United States Patent [19]

Mukai et al.

[11] Patent Number: 5,385,369
[45] Date of Patent: Jan. 31, 1995

[54] VEHICLE HAVING STRUCTURE FOR FITTING SUSPENSION TO VEHICLE BODY

[75] Inventors: Yoshiaki Mukai; Yoji Tokiwa; Seiji Miyamoto, all of Hiroshima, Japan

[73] Assignee: Mazda Motor Corporation, Hiroshima, Japan

[21] Appl. No.: 58,738

[22] Filed: May 10, 1993

[30] Foreign Application Priority Data

May 9, 1992 [JP] Japan .................. 4-037683[U]

[51] Int. Cl.⁶ .............................................. B62D 21/00
[52] U.S. Cl. .................................................... 280/788
[58] Field of Search ............... 280/691, 785, 788, 692, 280/693, 690, 673

[56] References Cited

FOREIGN PATENT DOCUMENTS 62-202402 12/1987 Japan .

*Primary Examiner*—Karin L. Tyson
*Attorney, Agent, or Firm*—Keck, Mahin & Cate

[57] ABSTRACT

A vehicle having a suspension fitting structure that includes a cross member which extends between left and right side frame members and supports the suspension device on each end thereof, and a plurality fitting brackets secured to the side frame member for fitting both of the cross member and a suspension arm to the side frame member. The fitting brackets are arranged in the lengthwise direction at appropriate separations in such a way that the fitting brackets are formed lower in structural rigidity in order front to rear and/or that a forward one of the fitting brackets is formed smaller in size than a rearward one.

20 Claims, 10 Drawing Sheets

VEHICLE HAVING STRUCTURE FOR FITTING SUSPENSION TO VEHICLE BODY

BACKGROUND OF THE INVENTION

1. Field of the Invention

The present invention relates to a vehicle having a structure for assembling or fitting a suspension to a vehicle body by means of a plurality of brackets.

2. Description of Related Art

Typically, in order to increase not only the facility for assembling or fitting front suspension devices, such as the strut type of suspension devices and the double wishbone type of suspension devices, to an automotive vehicle but also the structural stiffness and rigidity of such suspension devices, the right and left suspension devices are interconnected by means of a suspension cross member, extending in the transverse direction of the vehicle body and ordinarily formed at each end with an upwardly extending bracket by means of which the suspension cross member is secured to a side frame member of a front frame. Such a suspension device assembling structure is known from, for instance, Japanese Unexamined Utility Model Publication No. 62-02402.

For four-wheel drive vehicles, because the suspension cross member is also used to mount various vehicle elements, such as a steering unit and a front differential, thereon, it is bolted, or otherwise secured, to downwardly extending brackets of the side frame members of the front frame through the upwardly extending brackets thereof. Otherwise, right and left suspension arms of the front suspension device is partly fitted in opposite ends of a hollow or channel shaped suspension cross member and pivoted by pivot shafts secured or mounted to the suspension cross member via rubber bushes.

Specifically, the suspension cross member adapted to support a suspension device, such as of a strut-type and of a double-wishbone type having A-type suspension arms, each of which has a front arm portion and a rear arm portion, is formed with support means on opposite ends. Each support means extends in a lengthwise direction of the vehicle body and supports the front and rear arm portions on the lengthwise ends for pivotal movement. One of the front and rear suspension arms, which extends roughly in a transverse direction of the vehicle body, is placed nearly in alignment with the cross member in the transverse direction. Such a placement of the suspension arm is intended to efficiently absorb external force to the suspension arm by the cross member. In this instance, there are provided a plurality of brackets for supporting the suspension cross member and the suspension arm.

Such a pivot shaft for pivoting the suspension arm suffers great force through the suspension device and, consequently, the suspension cross member must be provided with a sufficiently strong reinforcement structure around the pivot shaft. However, such a reinforcement structure needs a number of extra parts and increases the weigh of a vehicle body.

Moreover, in order to efficiently absorb energy during a front-end collision, the front body is designed and adapted to crush gradually from the front to the back and to prevent its own crush from developing to a dash panel. However, by reason of energy distribution, a forward bracket tends to make the front body absorb less energy, and a backward bracket tends to be insufficient in rigidity. In such a case, since the dash panel is possibly deformed by the crushed front body, it must be provided with a reinforcing structure which is unavoidably bulky.

SUMMARY OF THE INVENTION

It is, therefore, an object of the present invention to provide an improved structure for a suspension cross member to which a suspension arm is fitted with a sufficient fitting strength.

It is another object of the present invention to provide an improved structure for a suspension cross member, to which a suspension arm is fitted, without increasing the number of parts.

It is a further object of the present invention to provide a structure for fitting a suspension device which can improve the safety of occupants of a vehicle.

The above objects of the present invention are achieved by providing a structure for fitting a suspension device to a body frame of a vehicle body. The structure includes a cross member which extends between left and right side frame members, each frame member extending in a lengthwise direction of the vehicle body and forming part of the body frame, and which supports the suspension device on each end thereof. The structure further includes fitting bracket means, comprising a plurality of brackets secured to the side frame member, for fitting both of the cross member and a suspension arm to the side frame member. The fitting brackets are arranged in the lengthwise direction at appropriate separations in such a way that one of the fitting brackets before another one is formed to be lower in structural rigidity than the other one and/or that one of the fitting brackets is formed smaller in size than the other one.

The suspension arm, which has a front arm portion and a rear arm portion, is located so as to position the front arm portion before and near a wheel center axis and the rear arm portion after the wheel center axis in the lengthwise direction. The suspension cross member is provided with a reinforcement member for structurally reinforcing its one end thereof which is connected to the vehicle body by means of the fitting bracket.

A plurality of, for instance three, the fitting brackets thus arranged absorb efficiently crush energy caused during a front-end collision and, consequently improves greatly the safety of occupants of the vehicle. In addition, since the rear fitting bracket, which has the highest structural stiffness and rigidity among the three, is located near and below the dash panel, the deformation of the dash panel is efficiently prevented even during a front-end collision. The intermediate fitting bracket is located behind and above the tie rod, so that, when a front-end collision occurs and the suspension cross member breaks away from the front fitting bracket, the suspension cross member moves downward or descends and, consequently, allows the steering rack unit to escape downward. This simplifies the steering system from a steering handle to a steering unit for securely preventing backward movement of the steering handle.

BRIEF DESCRIPTION OF THE DRAWINGS

The above and other objects and features will be understood more clearly and fully from the following detailed description with respect to a preferred embodiment thereof when considered in conjunction with the accompanying drawings. In the drawings, the same reference numerals have been used to denote the same or similar elements throughout, in which.

DETAILED DESCRIPTION OF THE PREFERRED EMBODIMENT

Figure 1:
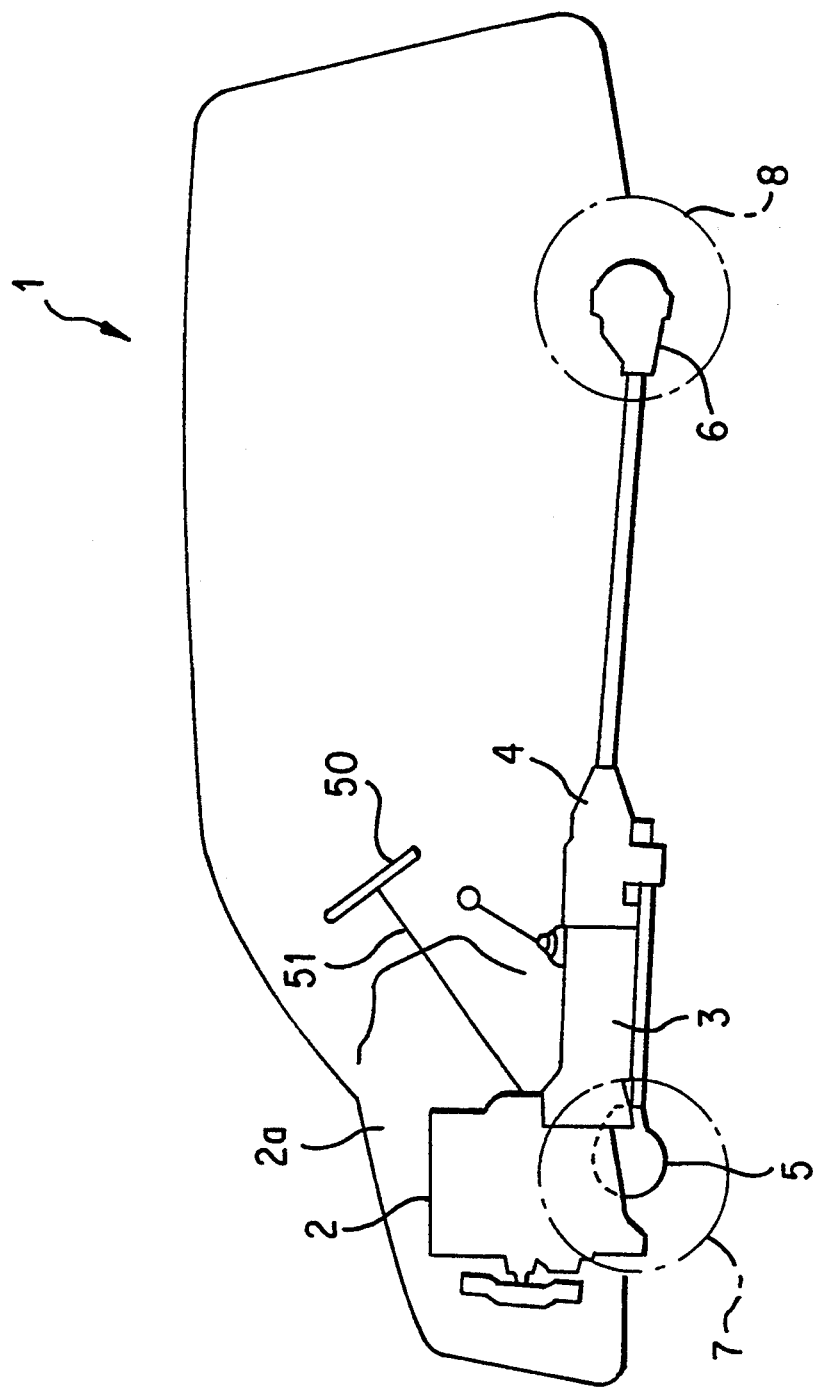
FIG. 1 is a schematic illustration of a drive system of a four-wheel drive vehicle.

Referring to the drawings in detail, and, in particular, to FIG. 1, an automotive vehicle 1, for instance a four-wheel drive vehicle, having a structure for assembling a strut type of front suspension device in accordance with a preferred embodiment of the present invention is schematically shown. The vehicle 1 is provided with an engine 2 mounted in a front engine compartment 2a, a manual transmission 3 and a transfer 4. Engine torque generated by the engine 2 is transferred to front and rear differentials 5 and 6 through the manual transmission 3 and the transfer 4 and delivered to front and rear wheels 7 and 8, respectively. All these power train elements 3–6 are well known in the art and may take any known form.

Figure 2:
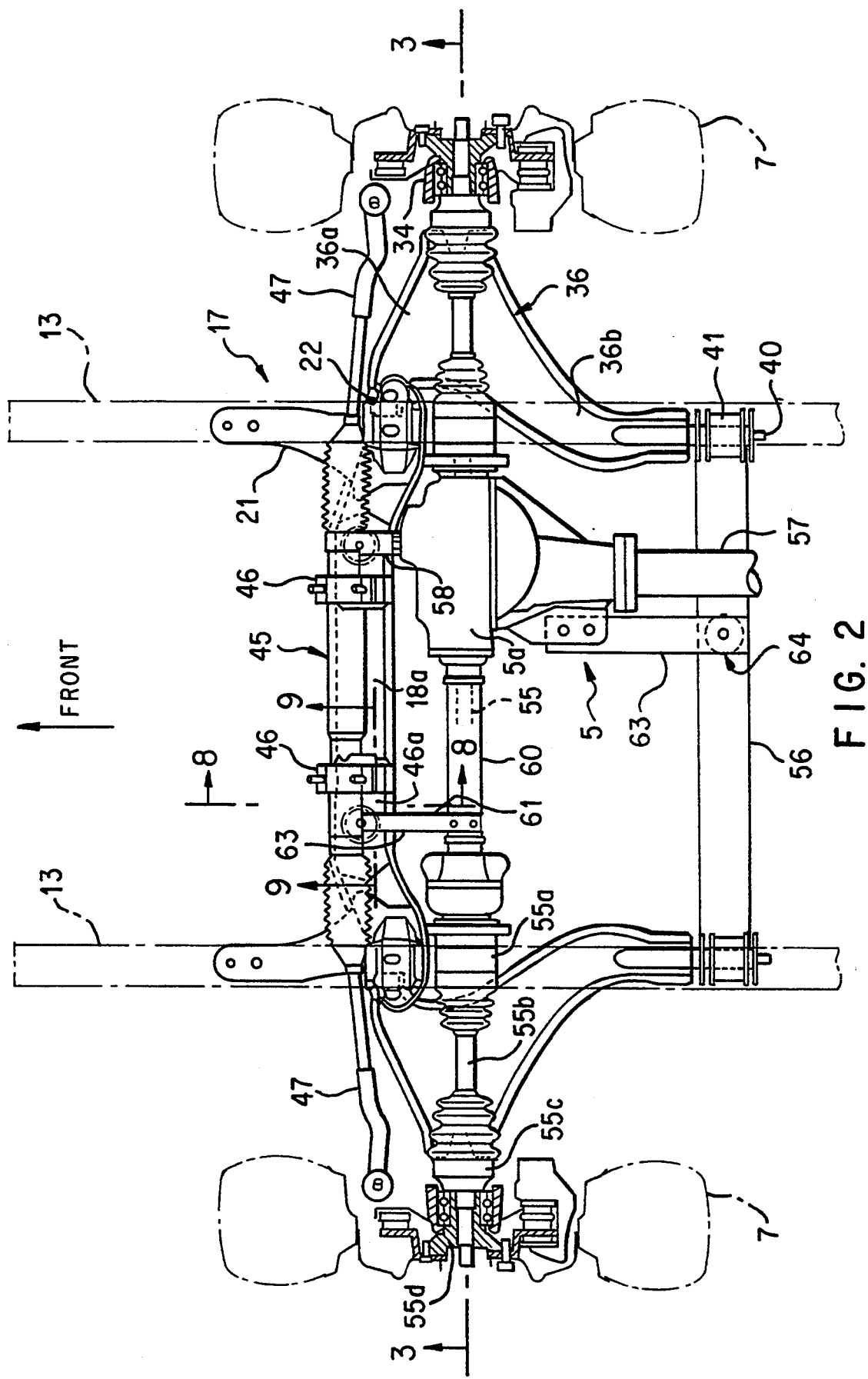
FIG. 2 is a plan view of the front section of a drive system partly in section.
Figure 3:
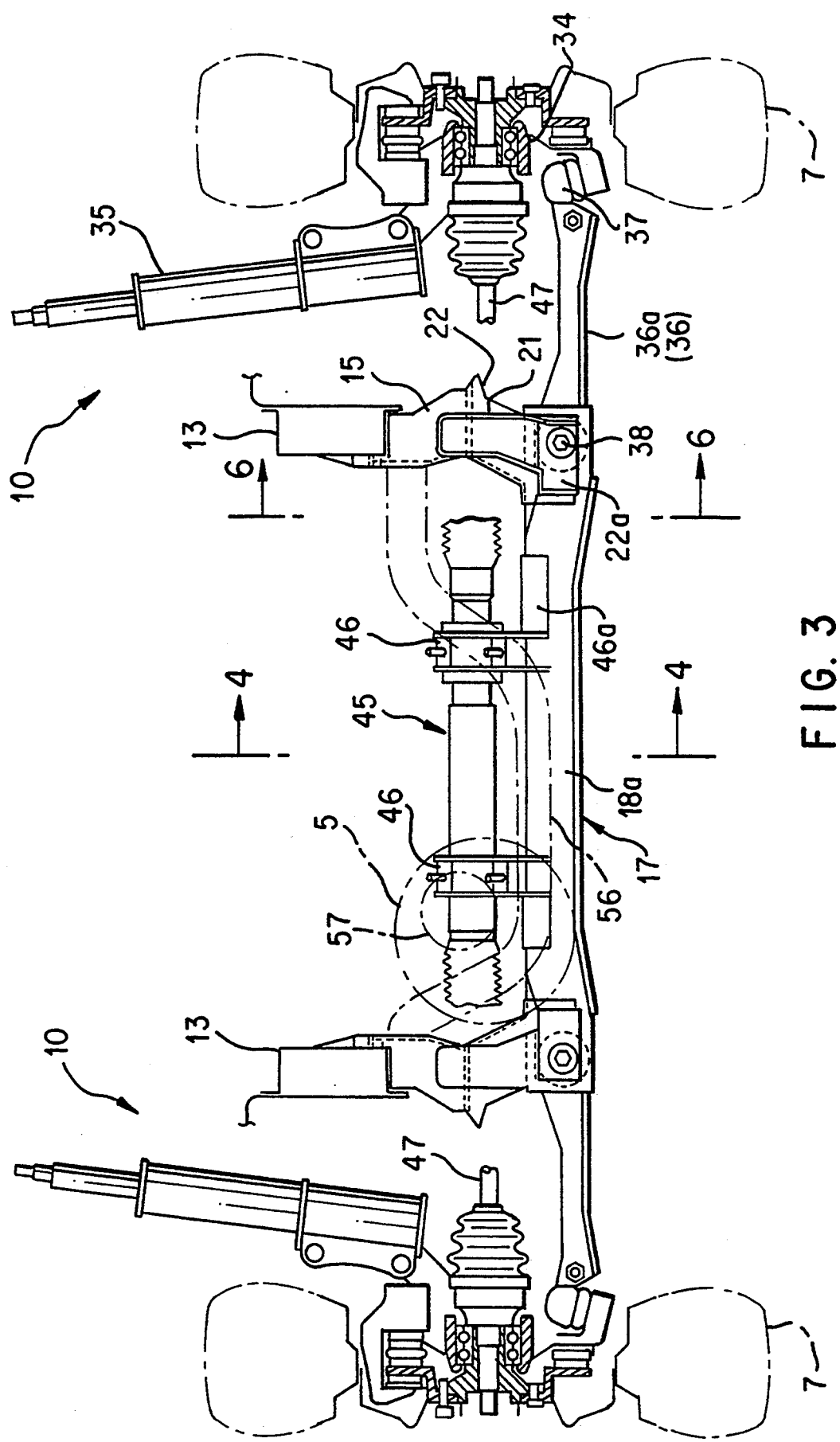
FIG. 3 is a front view of the front section of a drive system partly in section.
Figure 4:
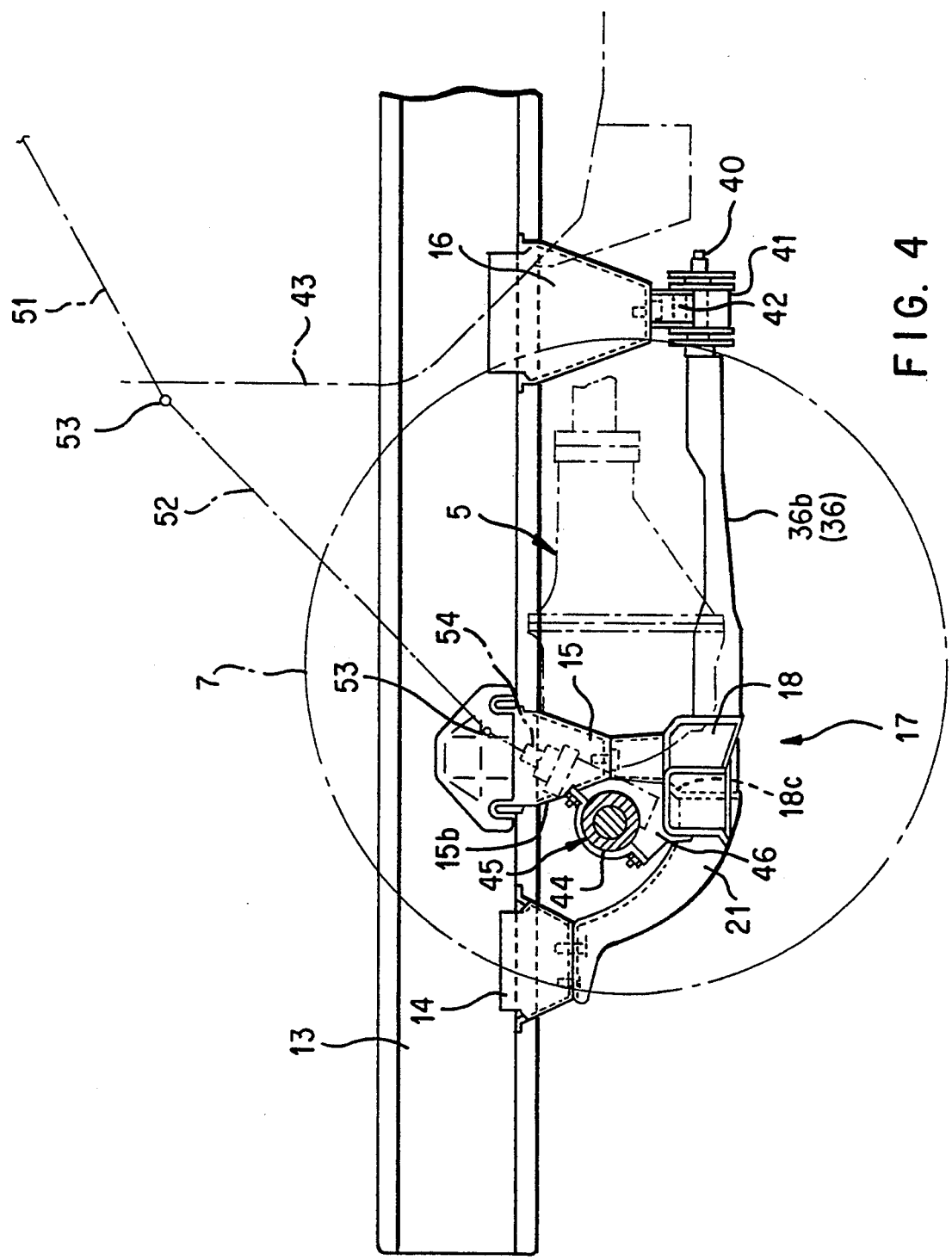
FIG. 4 is a cross-sectional view of FIG. 3 taken along line 4—4.
Figure 5:
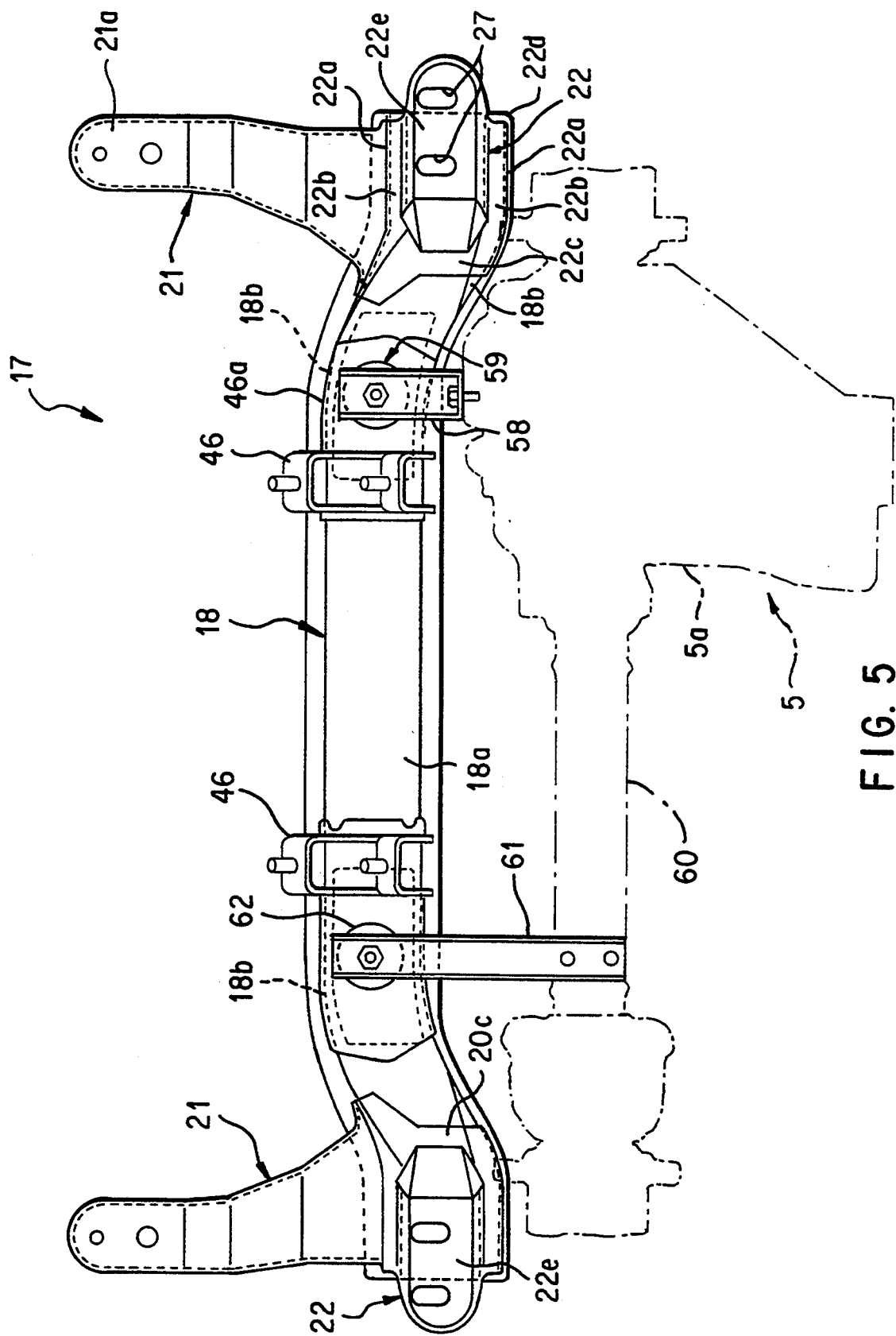
FIG. 5 is a plan view of a suspension cross member.
Figure 6:
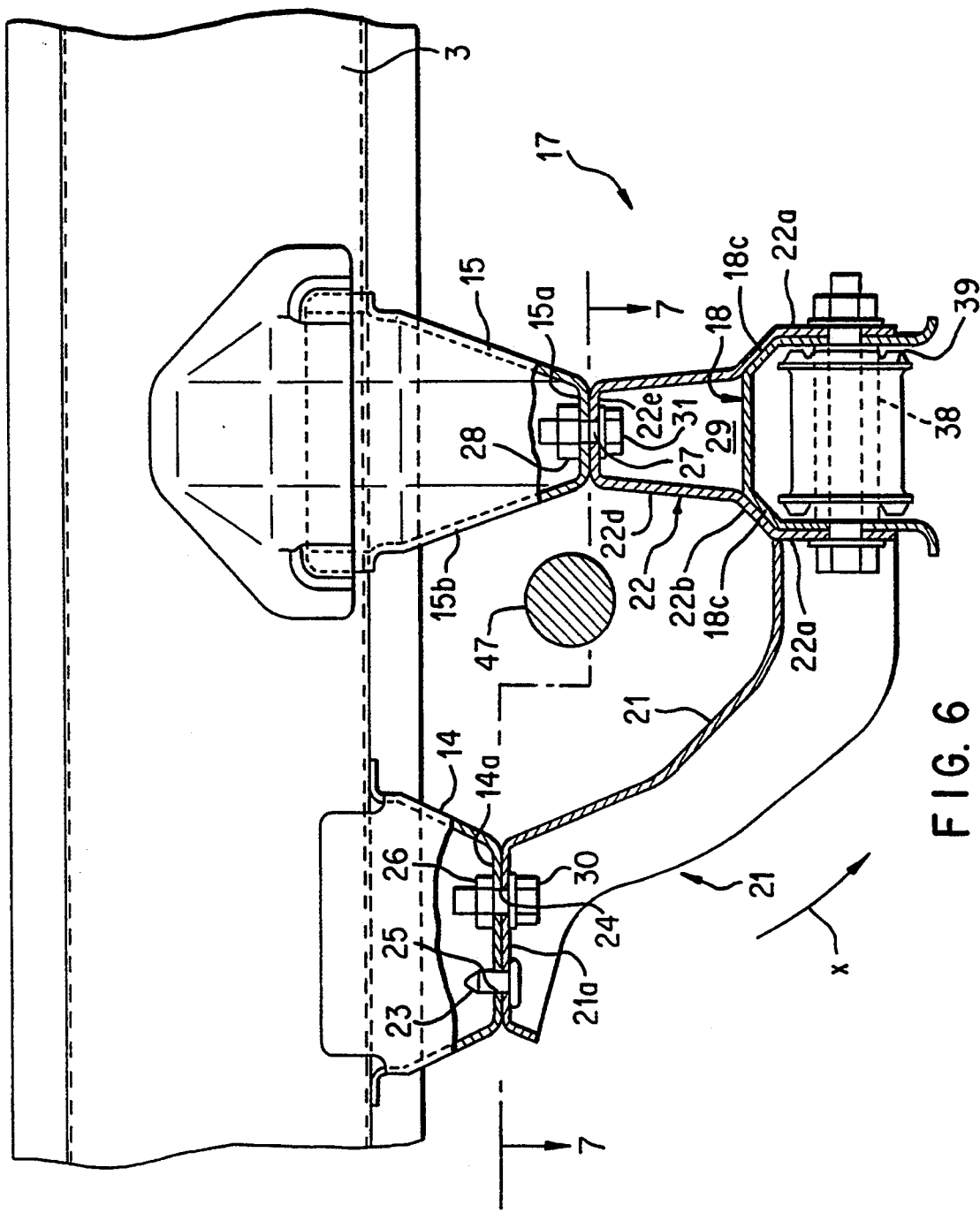
FIG. 6 is a cross-sectional view of FIG. 3 taken along line 6—6.
Figure 7:
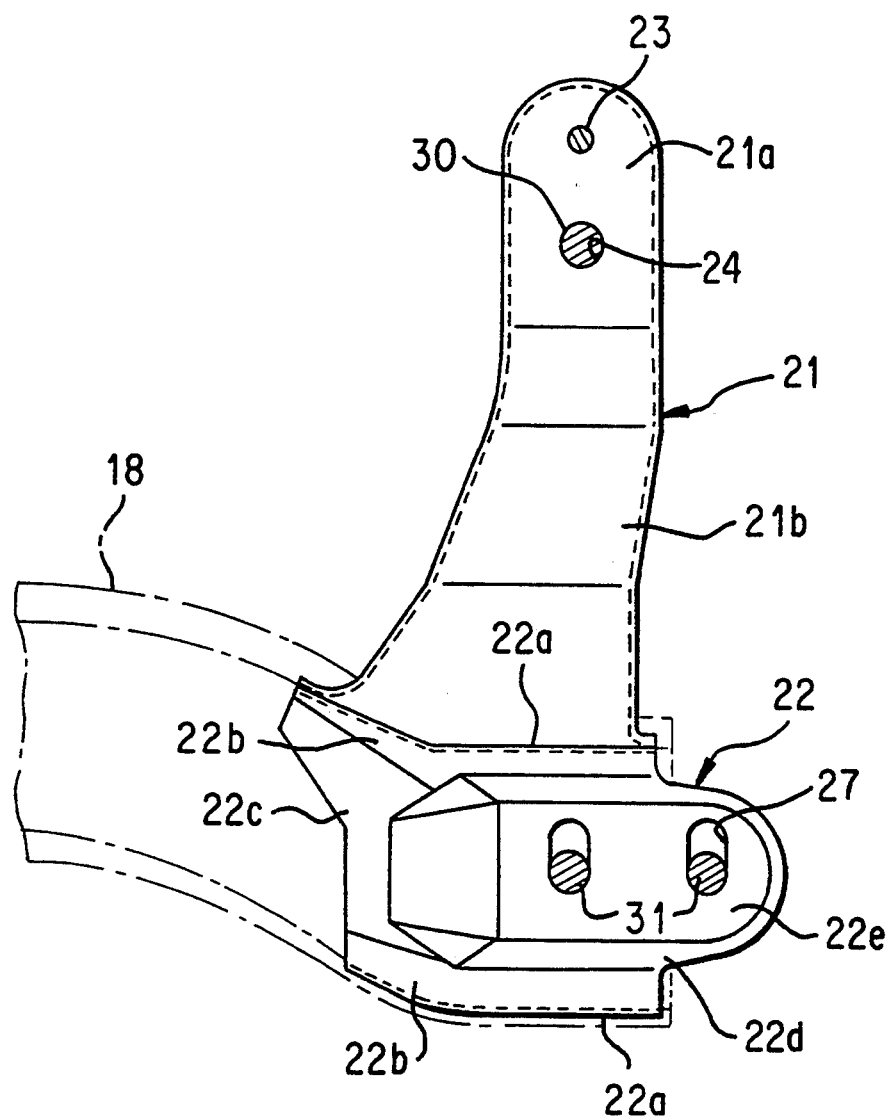
FIG. 7 is a cross-sectional view of the suspension cross member taken along line 7—7 of FIG. 6.
Figure 8:
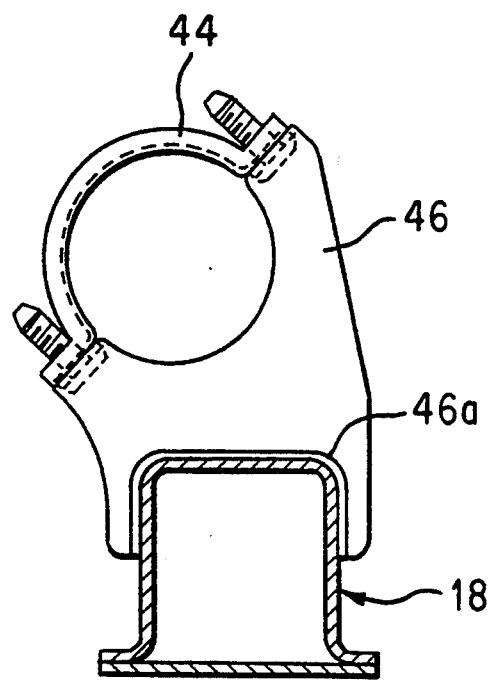
FIG. 8 is a cross-sectional view of FIG. 2 taken along line 8—8.

Each of the front wheels 7 is associated with by a strut type of right and left front suspension devices 10. Each of the front suspension devices 10 is supported by the vehicle body by means of a suspension cross member 17 assembled or fitted to the vehicle body through the structure of the invention as shown in FIG. 2-4 in detail. Specifically, the vehicle body has right and left front side frames 13, each of which extends in the lengthwise direction of the vehicle body and which is provided in its lengthwise central section with a plurality of, for instance in this embodiment three, generally rectangularly shaped fitting brackets 14, 15 and 16 arranged at appropriate separations. All of the fitting brackets 14–16 are similar but different in size from one another. In more detail, the front or first fitting bracket 14 is sized smallest so as to be lowest in stiffness and rigidity among the three, and the rear or third fitting bracket 16 is sized largest so as to be highest in stiffness and rigidity among the three and is located near and below a dash panel 43. The front and intermediate fitting brackets 14 and 15 are used to assemble or fit the suspension cross member 17 to the right and left front side members 13.

As shown in FIGS. 5-8, the suspension cross member 17 is mainly formed by a hollow cross beam 18 which has a closed cross section of straight portion 18a and right and left end portions 18b slightly bent rearward and opening underside. Each of the right and left end portions 18b is formed with front and rear inclined walls 18c so as to provide an opening broader than the width of the straight portion 18a of the cross beam 18. The cross beam 18 is formed with right and left front brackets 21 extending forwardly upward from the opposite ends thereof and right and left top brackets or abutment posts 22 extending upward from the opposite ends thereof, respectively. The suspension cross member 17 is specifically secured to the front side frames 13 through the right and left top abutment posts 22 bolted to the right and left intermediate or second fitting brackets 15 and through the right and left front brackets 21 bolted to the front or first fitting brackets 14. The cross beam 18 is transversely located so as to place its straight portion 18a under and closely in front of the front differential 5 and also place the end portion 18b right under the second or intermediate fitting brackets 15.

Each of the right and left top abutment posts 22 is formed as an integral single element by front and rear reinforcement wall portions 22a welded, or otherwise secured, to front and rear walls of the end portion 18b of the cross beam 18, front and rear inclined wall portions 22b extending upward from the respective front and rear reinforcement wall portions 22a and welded, or otherwise secured, to the respective front and rear inclined walls 18c of the end portion 18b of the cross beam 18, a flange portion 22c extending laterally inward and welded, or otherwise secured, to the top wall of the straight portion 18a of the cross beam 18, and a bracket portion 22d, which is directly bolted to the intermediate fitting bracket 15, extending upward from the front and rear inclined wall portions 22b and the flange portion 22c so as to have a generally U-shaped cross section. The bracket portion 22d opens laterally to the outside thereof so as to provide access opening into the working space 29 within the top abutment posts 22. The bracket portion 22d has a top wall portion 22e formed with a pair of, or outer and inner, slots 27 extending in the lengthwise direction and arranged in parallel with each other at an appropriate separation in the transverse direction. On the top wall portion 22e, there is welded, or otherwise secured, a nut 26 at the rear end of the inner slot 27. Bolting of the top abutment post 22 to the lower flange 15a of the intermediate fitting bracket 15 is performed through the access opening and working space 29 of the bracket portion 22d.

Each of the right and left front brackets 21, having a generally U-shaped cross section opening underside, is formed as an integral single element by an arm portion 21b, bent upward and secured to the front wall portion 22a of the top abutment post 22, and a bracket portion 21a, horizontally extending from the top end of the bent arm portion 21b. The bracket portion 21a is provided with a positioning pin 23 extending upward therefrom by means of which the front bracket 21 is properly positioned relative to the front fitting bracket 14 of the front side frames 13 when the positioning pin 23 is fitted in a positioning hole 25 formed in a lower wall 14a of the front fitting bracket 14. The bracket portion 21a is further formed with a hole 24 through which a fastening bolt 30 is inserted. On the other hand, a nut 26 is secured to the lower wall 14a of the front fitting bracket 14 where a bolt hole is formed. After fitting the positioning pin 23 in the positioning hole 25, the front bracket 21 of the suspension cross member 17 is fastened to the front fitting bracket 14 by the fastening bolt 30.

Each of the right and left front suspension devices 10, which is general in structure, has a shock absorber 35, an A-type suspension arm 36 and a coil spring (not shown). The shock absorber 37 is supported at its top end by a suspension tower (not shown). The A-type suspension arm 36 is, on one hand, linked at its outer end to a wheel support 34 for pivotal movement by means of a ball joint 37. On the other hand, a front arm portion 36a of the A-type suspension arm 36 is partly inserted in the end portions 18b of the cross beam 18 and is supported for pivotal rotation with respect to the suspension cross by means of a shaft 38 mounted within the end portions 18b of the cross beam 18 through a rubber bush 39. Further, a rear arm portion 36b of the A-type suspension arm 36, which is bent inwardly and backwardly, is provided with a connecting pin 40 extending in the lengthwise direction from the rear end thereof and is supported for pivotal rotation by the rear fitting bracket 16 through an engagement between the connecting pin 40 and a connecting sleeve 41 with a mount block 42 bolted, or otherwise secured, to the rear fitting bracket 16.

Referring to FIGS. 2–6, 8 and 9, a steering rack unit 45 is mounted on the suspension cross member 17 by a pair, or right and left mounting brackets 46 secured to the cross beam 18 of the suspension cross member 17 and fixing belts or straps 44 bolted to the mounting brackets 46. Each of the right and left mounting brackets 46 is integrally formed with a U-shaped reinforcement flange 46a which extends laterally outwardly and sits astride the end portion 18b of the cross beam 18. A tie rod 47, extending laterally from each of the ends of the steering rack unit 45 so as to pass in front of the front side of the intermediate fitting bracket 15, is connected to the wheel support 34. Operation of the steering handle or wheel 50 (see FIG. 1) is transmitted to the steering rack unit 45 via a steering shaft 51, an intermediate 52 and a universal joint 53 (see FIG. 4) in this order.

Referring again to FIGS. 2–5, the front differential 5 is positioned behind the right side portion of the suspension cross member 17. A side gear shaft 55 of the front differential 5 extends on both sides of the front differential 5 and connected to each of the front wheels 7 through a universal joint 55a, a front axle 55b, a universal joint 55c and an axle hub 55d in this order. The universal joint 55a is positioned behind the top abutment post 22. The axis of the front axle 55b is positioned slightly forward from the center of the A-type suspension arm 36 in the lengthwise direction. There is provided a differential cross member 56 transversely extending between the front side frames 13. The ends of the differential cross member 56 are welded, or otherwise secured, to both rear fitting bracket 16 and front side frame 13. Each of the end portions of the differential cross member 56 is bent down so as to pass under a shaft cover pipe 57 through which an input shaft of the front differential 5 passes through. A differential casing 5a of the front differential 5 is provided with a front support member 58 secured thereto on its front side and extending above the right end portion 18b of the suspension cross member 17. The front support member 58 is resiliently secured to a mount structure 59 fitted on the suspension cross member 17 so as to support the front differential 5 by the suspension cross member 17. On the other hand, the differential casing 5a is provided with a shaft cover pipe 60 extending therefrom on the left side, through which the side gear shaft 55 passes. The shaft cover pipe 60 is resiliently supported by the suspension cross member 17 through a side support member 61 via a mount structure 62 fitted to the right end portion 18b of the suspension cross member 17. Further, the differential casing 5a is provided with a rear support member 63 through which the front differential 5 is resiliently supported by the differential cross member 56 via a mount 64 secured to the differential cross member 56.

Because the mounting structures 59 and 62 are identical in structure with each other, only one of them will be hereafter described in detail.

Figure 9:
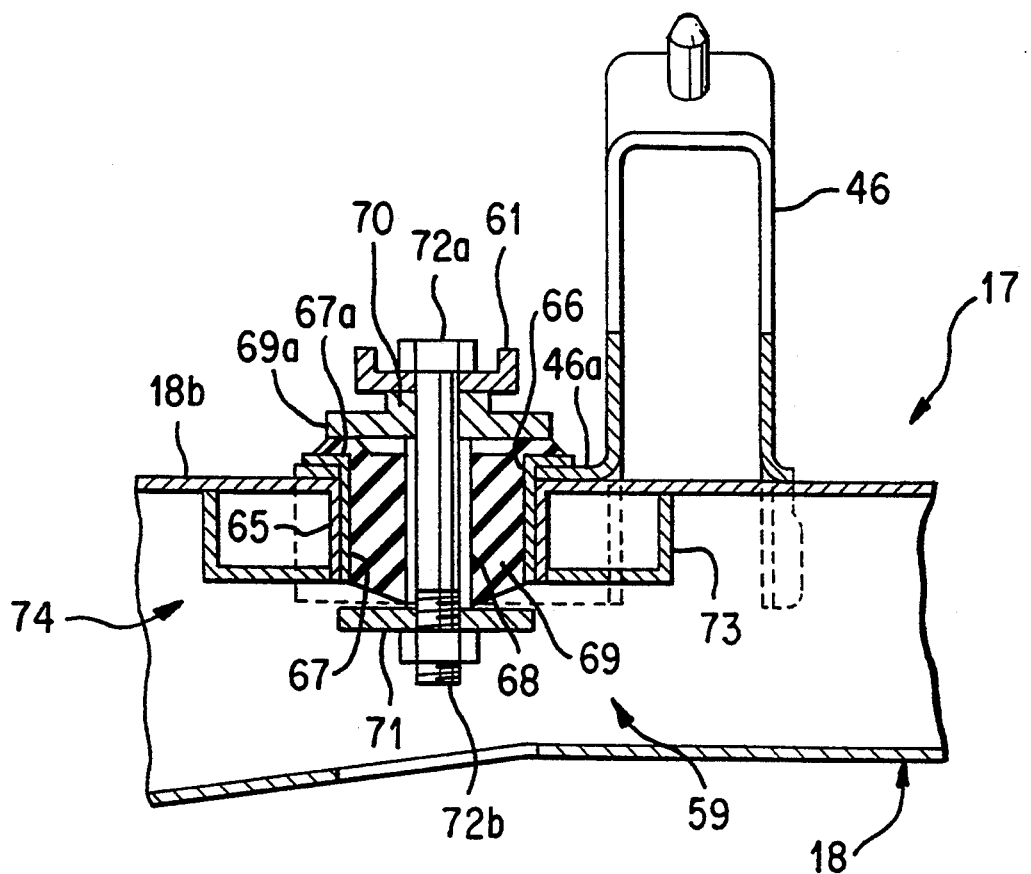
FIG. 9 is a cross-sectional view of FIG. 2 taken along line 2—2.

Referring to FIG. 9, the mounting structure 59 includes a cylindrical sleeve 65 integrally formed with the top wall of the end portion 18b of the cross beam 18 and extending downward. On the top of the end portion 18b of the cross beam 18, the U-shaped reinforcement flange 46a of the mounting brackets 46, having an opening 66 in conformity with the cylindrical sleeve 65, is overlapped. The mounting structure 59 further includes an outer cylindrical sleeve 67 firmly fitted in the opening 66 of the U-shaped reinforcement flange 46a of the mounting brackets 46 and the cylindrical sleeve 65. The outer cylindrical sleeve 67 is formed with a flange 67a by means of which it is prevented from slipping out from the cylindrical sleeve 65. The outer cylindrical sleeve 67 is filled with a rubber bush 69, having cushioning flange 69a over the flange 67a of the outer cylindrical sleeve 67, for holding an inner cylindrical sleeve 68 coaxially with the outer cylindrical sleeve 68. The inner cylindrical sleeve 68 is provided with upper and lower annular rings 70 and 71 for being prevented from its own up and down axial movement. The front end of the support member 61 is placed on the upper annular ring 70 and is fastened to the inner cylindrical sleeve 68 by means of a fastening bolt 72a and a nut 72b. Inside the end portion 18b of the cross beam 18, there is provided a cylindrical reinforcement member 73 having a generally L-shaped cross section which is welded to the upper wall of the end portion 18b and the cylindrical sleeve 65 so as to structurally reinforce the mount structure 59.

As well known in the art, when the vehicle 1 experiences a front-end collision, the front side frame 13 and structural elements near the front side frame 13 are crushed from the front toward the back and in the process absorbs external energy caused by the crush. In order to increase the efficiency of external energy absorption during a front-end collision, it is desired to avoid an incomplete or insufficient crush of the front body portion of the vehicle 1 which may be attributed to a high structural strength and rigidity of suspension cross member 17 and A-type suspension arm 36. For this reason, forming of the front bracket 21 of the suspension cross member 17 to have a U-shaped cross section opening downward provides the front bracket 21 with relatively low strength and rigidity against crush energy imposed thereon or exerted thereto, so as to prevent the front body portion of the vehicle 1, around and related to the front bracket 21, from being insufficiently crushed. In addition, since the front bracket 21 is positioned relative to and secured to the front fitting bracket 14 by means of the positioning pin 23 and the fastening bolt 30, the connecting strength of the bracket portion 21a to the front bracket 14 is set lower, and therefore, the connection between the front fitting bracket 14 and the front bracket 21 is easily breakable or broken during a front-end collision. On the other hand, since the top abutment posts 22 of the suspension cross beam 17 are connected to the intermediate fitting bracket 15 by means of the fastening bolt 31 in the slot 27, when a great deal of energy is imposed on or exerted to the suspension cross member 17 rearward in the lengthwise direction, the fastening bolt 31 moves forward in and relative to the slot 27 to the end of the slot 27. Consequently, when the fastening bolt 31 abuts the end of the slot 27, the bolt 31 or the slot 27 is sheared off or broken, so as to allow the top abutment post 22 to be broken or to break away from the intermediate fitting bracket 15 along with the A-type suspension arm 36. This also prevents the front body portion of the vehicle 1, around and related to the A-type suspension arm 36, from being insufficiently crushed.

The structure, in which the top abutment post 22 is firmly fastened to the intermediate fitting bracket 15 by two fastening bolts 31 and the front and rear inclined wall portions 22b of the top abutment post 22 are secured to the front and rear inclined walls 18c of the end portions 18b of the suspension cross member 17, (the supporting structure for the suspension cross member 17) is sufficiently strong against a vertical energy imposed on or exerted vertically to the front arm portion 36a of the A-type suspension arm 36. In addition, since the front and rear reinforcement wall portions 22a of the top abutment post 22 are firmly secured to front and rear walls of the end portion 18b of the suspension cross member 17, the fitting structure for the top abutment post 22 and the front arm portion 36a of the A-type suspension arm 36 relative to the suspension cross member 17 is improved in strength.

The fitting brackets 14–16, which are arranged in such a way that each one placed forward of the other or next one is lower in structural stiffness and rigidity than the other or next to the rear, absorb efficiently crush energy caused upon a front-end collision. This improves greatly the safety of occupants of the vehicle 1. In addition, since the rear fitting bracket 16, which has the highest structural stiffness and rigidity among the three, is located near and below the dash panel 43, the deformation of the dash panel 43, such as caused during a front-end collision, is efficiently prevented. Furthermore, since the intermediate fitting bracket 15 is located behind and above the tie rod 47 and partly overlaps the tie rod 47 in the lengthwise direction, when a front-end collision occurs and the suspension cross member 17 breaks away from the front fitting bracket 15, the suspension cross member 17 moves downward or descends and, consequently, allows the steering rack unit 45 to escape downward. This simplifies the steering system from the steering handle 50 to the steering unit 45 for securely preventing backward movement of the steering handle 50. In addition, the intermediate fitting bracket 15 is formed with the inclined surface 15b extending downward and backward on the front side, the suspension cross member 17, having broken away from the intermediate fitting bracket 15, is promoted to move downward or descend, so as to prevent more securely backward movement of the steering handle 50. Furthermore, since the cross beam 18 of the suspension cross member 17 is secured to the right and left front fitting bracket 14 through the right and left front brackets 21 extending forward and bent upward, the suspension member 17 turns in a direction shown by an arrow X in FIG. 6 during a front-end collision by energy exerted backward to the front brackets 21, so as to promote downward movement of the steering rack unit 45. This prevents more efficiently the steering handle 50 from backward movement.

The suspension fitting structure, in which the mount bracket 46 has the U-shaped reinforcement flange 46a extending laterally outwardly to the end portion 18b of the suspension cross member 17, the suspension cross member 17, especially the end portion 18b, is improved in structural stiffness and rigidity with only a reduced number of parts. Moreover, since the mount structures 59 and 62 are located where the suspension cross member 17 is reinforced by the reinforcement flange 46a of the mount bracket 46, they are improved in fitting strength.

Figure 10:
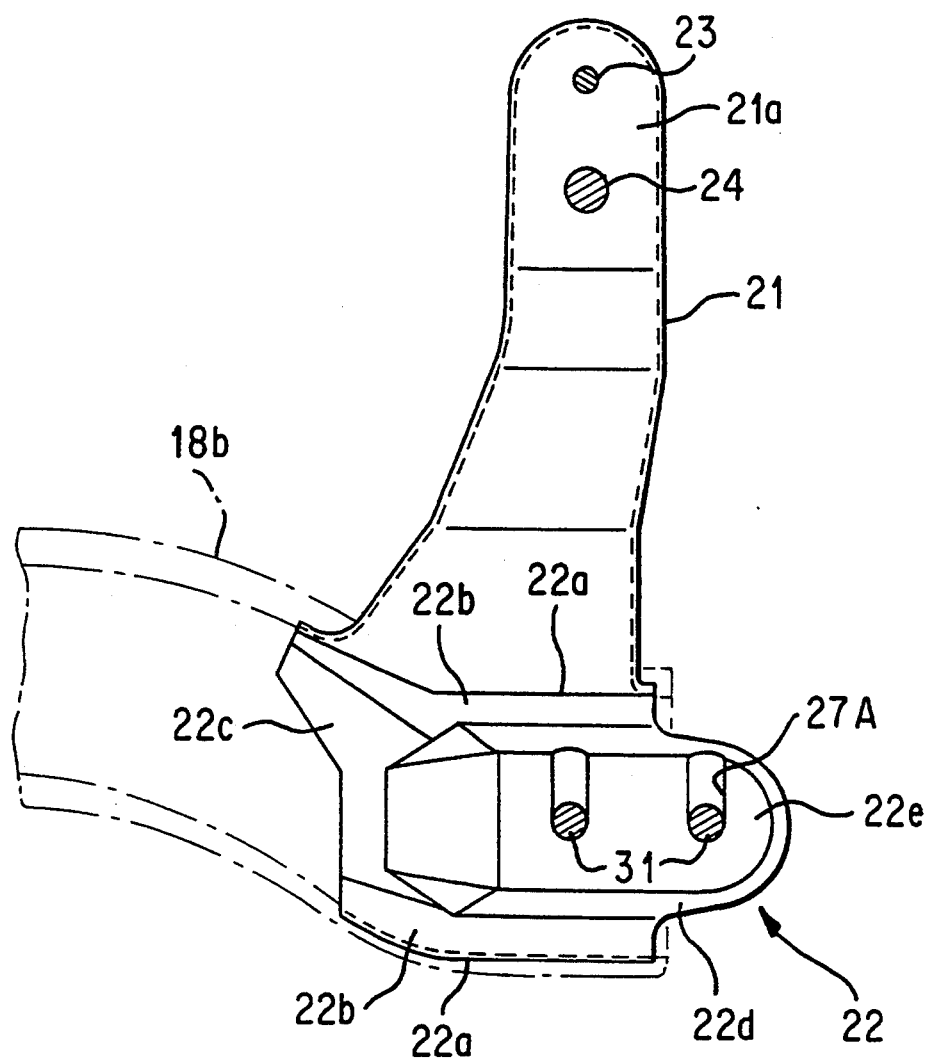
FIG. 10 is a top cross-sectional view, similar to FIG. 7, of part of a varied suspension cross member.
Figure 11:
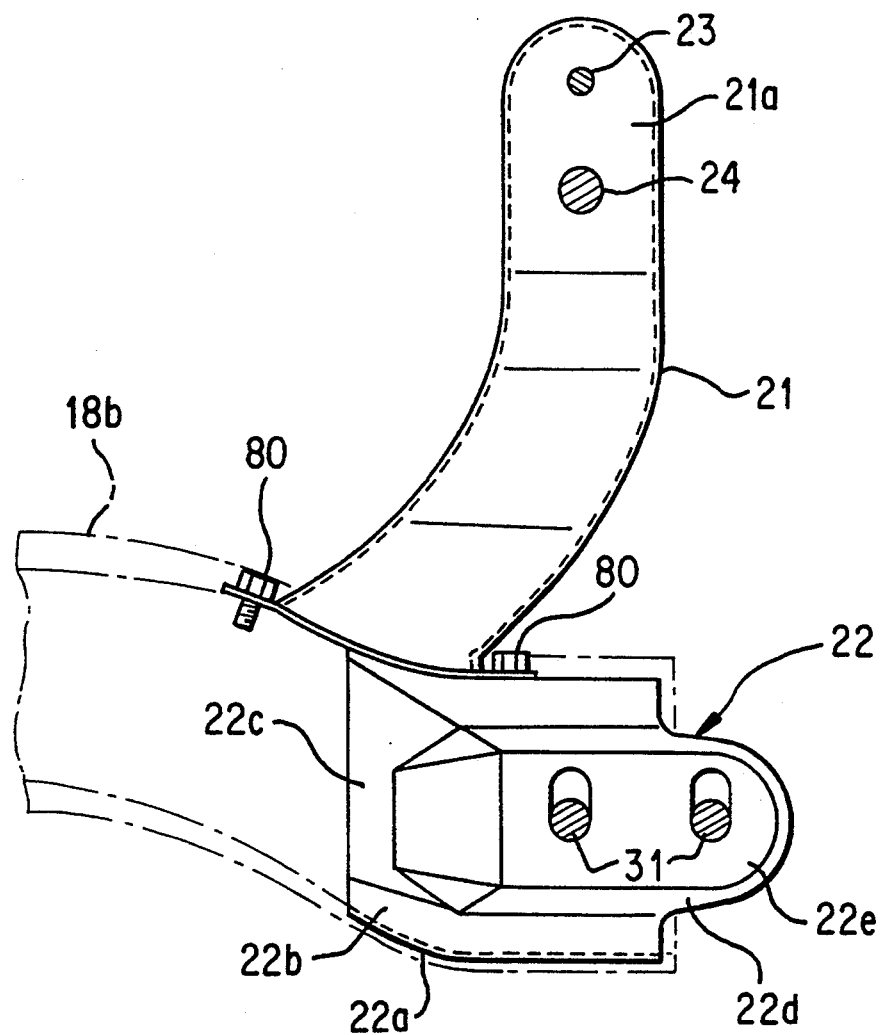
FIG. 11 is a top cross-sectional view, similar to FIG. 7, of part of a still varied suspension cross member.

Although the present invention has been described in detail with an exemplary embodiment thereof, however, various changes and modifications are possible. For example, each of the fitting brackets 14–16 may be varied in wall thickness in such a way that one placed forward the other is thinner in wall thickness than the other. The top wall portion 22e may be formed with open-ended slots 27A in place of the closed slots 27 as shown in FIG. 10. Moreover, as shown in FIG. 11, the front bracket 21 may be detachably secured to the cross beam 18 and the top abutment posts 22 of the suspension cross beam 17 with a plurality of fastening bolts 80. In this instance, the steering rack unit 45 can be removed without taking out the whole structure of suspension cross member 17, which improves maintenance service for the vehicle 1. The suspension fitting structure of this invention may applied to rear-drive vehicles and front drive vehicles as well as four-wheel drive vehicles. Furthermore, the suspension fitting structure of this invention may applied to vehicles provided with the double-wishbone type of suspensions as well as vehicles provided with the strut type of suspensions.

It is to be understood that various other embodiments and variants may occur to those skilled in the art by following the teaching therein, Any such other embodiments and variants which fall within the scope and spirit of the present invention are intended to be covered by the following claims.

What is claimed is:

1. In a structure, for fitting a suspension device to a body frame of the vehicle body, which includes a cross member extending between left and right side frame members, each of which extends in a lengthwise direction of said vehicle body from the front to the back, and forms part of said body frame, and further includes fitting bracket means, secured to each said side frame member, for fitting both of said cross member and suspension arms of the suspension device to each said side frame member, the improvement comprising that each said fitting bracket means includes a plurality of fitting brackets arranged in the lengthwise direction at predetermined lengthwise separations, each one of said plurality of said fitting brackets being formed to have a structural rigidity lower than the adjacent one to the rear.

2. A suspension device fitting structure as defined in claim 1, wherein one of said plurality of said fitting brackets is formed smaller in size than said the other one.

3. A suspension device fitting structure as defined in claim 2, wherein said suspension arm is of an A-type having front arm portion and a rear arm portion and is located so as to position said front arm portion before and near an axis of wheel center in the lengthwise direction and said rear arm portion after said wheel center axis in the lengthwise direction.

4. A suspension device fitting structure as defined in claim 3, wherein at least one of said plurality of said fitting brackets is located after said wheel center axis in the lengthwise direction so as to support said rear arm portion of said A-type suspension arm for pivotal movement.

5. A suspension device fitting structure as defined in claim 3, wherein at least two of said plurality of said fitting brackets are located before said wheel center axis in the lengthwise direction so as to rigidly support an end of said cross member.

6. A suspension device fitting structure as defined in claim 5, wherein said cross member supports for pivotal movement said front arm portion of said A-type suspension arm at said end thereof.

7. A suspension device fitting structure as defined in claim 5, wherein said cross member is provided with a reinforcement member on said one end for structural reinforcement.

8. A suspension device fitting structure as defined in claim 7, wherein said cross member is provided with a hollow abutment post through which said cross member is secured to at least one of said plurality of said fitting brackets, said hollow abutment being formed integrally with and extending upward from said reinforcement means.

9. A suspension device fitting structure as defined in claim 8, wherein said hollow abutment post is open laterally outward.

10. A suspension device fitting structure as defined in claim 8, wherein said cross member is formed at a junction between said hollow abutment post and said reinforcement means with front and rear outer surfaces inclined toward each other and upward.

11. In a vehicle having a structure, for fitting a suspension device to a body frame of the vehicle body, which includes a cross member extending between left and right side frame members, each of which extends in a lengthwise direction of said vehicle body from the front to the back, and forms part of said body frame, and further includes fitting bracket means, secured to each said side frame member, for fitting both said cross member and the suspension arms of the suspension device to each said side frame member, the improvement comprising that each said fitting bracket means includes a plurality of fitting brackets arranged spaced in the lengthwise direction with the forwardmost fitting bracket having the lowest structural rigidity and the remaining fitting brackets having greater structural rigidity in ascending order as they are spaced rearwardly.

12. In a vehicle as defined in claim 11, wherein one of said plurality of said fitting brackets is formed smaller in size than one to the rear thereof.

13. In a vehicle as defined in claim 12, wherein said suspension arm is of an A-type having front arm portion and a rear arm portion and is located so as to position said front arm portion before and near an axis of wheel center in the lengthwise direction and said rear arm portion after said wheel center axis in the lengthwise direction.

14. In a vehicle as defined in claim 13, wherein at least one of said plurality of said fitting brackets is located after said wheel center axis in the lengthwise direction so as to support said rear arm portion of said A-type suspension arm for pivotal movement.

15. In a vehicle as defined in claim 13, wherein said plurality includes at least three fitting brackets with at least two of said fitting brackets located before said wheel center axis in the lengthwise direction so as to rigidly support an end of said cross member.

16. In a vehicle as defined in claim 15, wherein said cross member supports for pivotal movement said front arm portion of said A-type suspension arm at said end thereof.

17. In a vehicle as defined in claim 15, wherein said cross member is provided with a reinforcement member on said one end for structural reinforcement.

18. In a vehicle as defined in claim 17, wherein said cross member is provided with a hollow abutment post through which said cross member is secured to at least one of said plurality of said fitting brackets, said hollow abutment being formed integrally with and extending upward from said reinforcement means.

19. In a vehicle as defined in claim 18, wherein said hollow abutment post is open laterally outward.

20. In a vehicle as defined in claim 18, wherein said cross member is formed at a junction between said hollow abutment post and said reinforcement means with front and rear outer surfaces inclined toward each other and upward.

* * * * *